United States Patent [19]

Schanne

[11] 3,708,655

[45] Jan. 2, 1973

[54] ARTICLE IDENTIFICATION APPARATUS

[75] Inventor: Joseph Francis Schanne, Cheltenham, Pa.

[73] Assignee: RCA Corporation

[22] Filed: April 30, 1971

[21] Appl. No.: 139,103

[52] U.S. Cl. ..............................235/61.11 E, 328/59

[51] Int. Cl. ............................G06k 7/10, H03k 3/00

[58] Field of Search ..........235/61.11 E; 340/146.3 K, 146.3 F, 340/174.1 B, 146.1; 250/219 Q, 219 CR, 219 D, 219 DD; 328/59, 63

[56] References Cited

UNITED STATES PATENTS 3,571,571 3/1971 Kapsambelis ..................235/61.11 E
3,617,707 11/1971 Shields et al. ..................235/61.11 E
3,623,028 11/1971 Yoshida et al. ................235/61.11 E

*Primary Examiner*—Daryl W. Cook
*Attorney*—H. Christoffersen

[57] ABSTRACT

Binary coded designator labels fixed to articles which they identify are scanned and the signals thereby obtained are employed to produce clock pulses. Various circuits are included for checking the accuracy of signals read from a label and for distinguishing them from marks or other data on the article.

7 Claims, 4 Drawing Figures

INVENTOR
JOSEPH F. SCHANNE
BY R. E. Smiley
ATTORNEY

INVENTOR.
JOSEPH F. SCHANNE
BY R. E. Smiley
ATTORNEY

ARTICLE IDENTIFICATION APPARATUS

BACKGROUND OF THE INVENTION

Systems have been disclosed heretofore that are designed to automate checkout counters in supermarkets, department stores, etc. One such system utilizes binary coded labels that are affixed to articles to designate the prices of the articles. The articles, and hence the coded labels, are optically scanned by scanning equipment to provide coded signals that are decoded to provide the prices of the articles. The total purchase price is therefore automatically obtained by the system without the necessity of having checkout clerks read the prices of many articles and record them in a cash register. However, in some such systems, no identification of the articles is provided and hence there is no inventory control.

To identify an article in a modern department store, supermarket, etc., it is necessary that a label be coded very densely with information data so as to be able to designate any one of the tens of thousands of articles that may be stocked in such stores. When a large amount of identifying information data is contained in a relatively small label, it is necessary that suitable coding be selected to permit the scanning equipment to be clocked by information derived from the label and also to permit the label to be distinguished from surrounding information on the article.

SUMMARY OF THE INVENTION

Serially occurring signals indicative of bits such as those sensed by an optical scanner, may be checked for validity and also distinguished from noise. Means may be included for self clocking the bits and for resynchronizing the clock signals, when necessary. Coding techniques may be employed to further aid validity checking.

DETAILED DESCRIPTION

Figure 1:
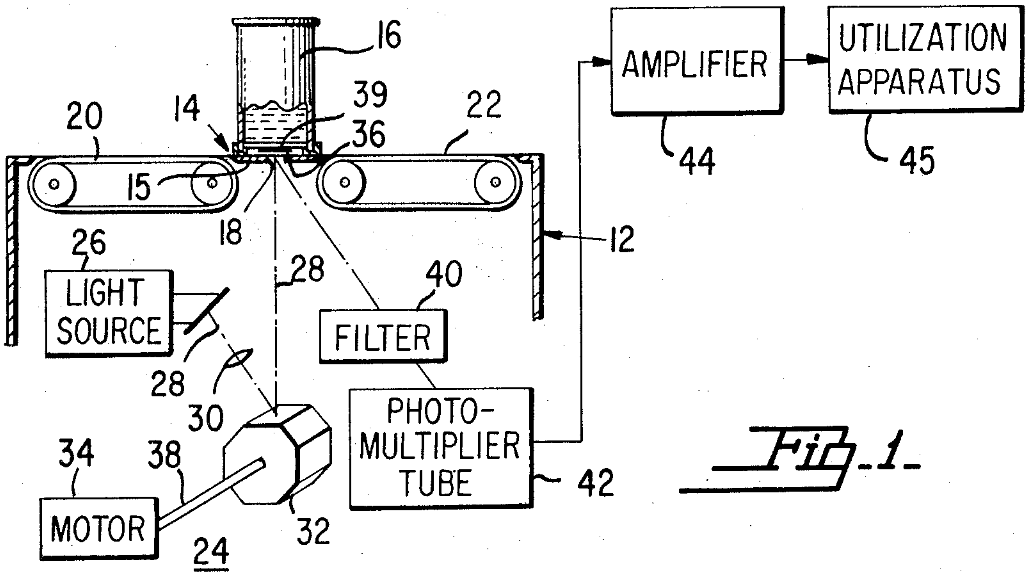
FIG. 1 is a schematic diagram of an article identification system for reading coded labels.

Referring now to FIG. 1, label scanning station 10 includes an article handling station which may, for example, include a checkout counter 12 having a movable counter top 14 for transporting articles 16 over a scanning aperture or slit 18 in the counter top 14. The counter top 14 may, for example, include a pair of conveyor belts 20 and 22 that are adjacent to and form the slit 18. Alternately, as shown, the slit may be formed in a rigid plate 15 spanning the space between the belts. The belts 20 and 22 convey the articles over and past the slit 18. The slit 18 may, for example, be on the order of one-fourth inch in width and 6 inches deep. The 6 inch depth goes into the drawing in FIG. 1. For the sake of drawing simplicity, the remaining portions of the counter top 14 and the side rails thereof are not shown in FIG. 1. The slit 18 is dimensioned to ensure that an article 16 may be scanned by an optical reading station positioned below the counter top 14.

The reading station 24 includes a light source 26 which may be a laser or other light source adapted to emit light beam 28 in the visible or near visible spectrum that is focused by a focusing lens 30 into a very fine scanning spot. The light beam 28 is intercepted and redirected to the slit 18 by a multifaced mirror 32. The light source 26 may, for example, comprise a helium-neon laser that is pumped to produce a continuous laser beam of red monochromatic light of approximately 6328 Angstrom wavelength.

The mirror 32 is mounted to be rotated at a substantially constant speed by a motor 34 about a shaft 38 and is positioned to intercept the light beam 28 and project this scanning beam 28 through the slit 18 in the counter top 14. The rotatable mirror 32 may be positioned offset from the slit 18 so that dirt, etc., falling through the slit 18 does not strike the mirror 32. The rotation of the mirror 32 causes a succession of light beam scans through the slit 18, each scan being in a direction generally transverse to the direction of movement of the article 16. The number and sizes of the faces of the mirror 32 are selected to produce only one scanning spot on the underside of the article 16 at any one time.

Each article 16 has affixed to the underside or botton thereof a coded designator 36 to be described in connection with FIG. 2. The coded designator 36 may, for example, comprise a label glued onto the article 16 by an adhesive 39. Alternatively, the designator 36 may be imprinted onto the article 16. However, the designator 36 will be described as a coded paper label in this specification.

The reading station 24 also includes an optical filter 40 and a photoresponsive pickup device such as a photomultiplier tube 42 that are positioned in series with each other and offset from the slit 18. Their purpose is to detect diffuse light reflected from designator 36. Diffuse light rather than specular light is picked up because specular reflection tends to make the designator 36 unreadable. The optical filter 40 is substantially matched to the monochromatic light emitted by the light source 26 (if a monochromatic source is used) and filters out ambient light having wavelengths not within the passband of the filter 40.

Figure 3:
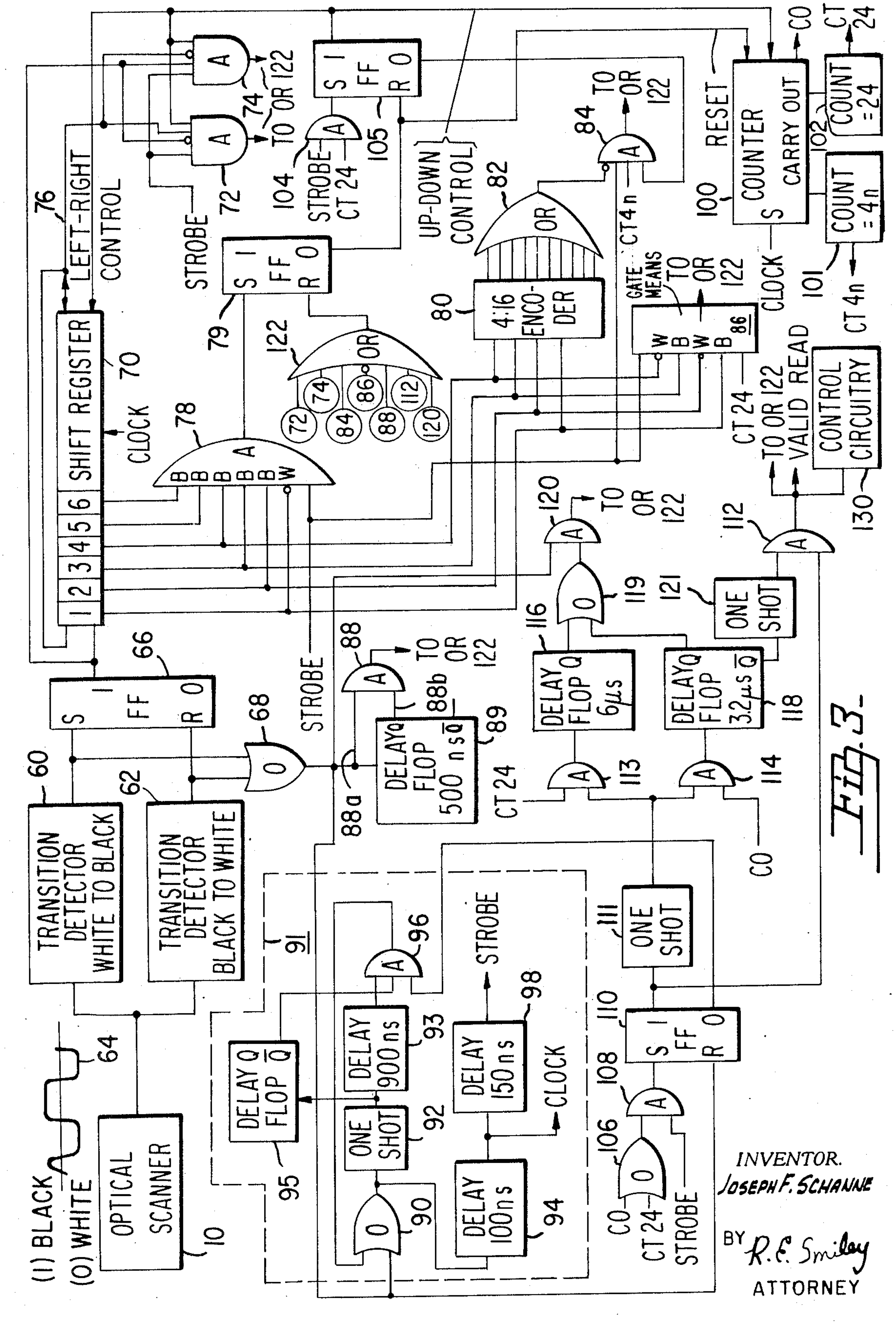
FIG. 3 is a logic schematic of circuits useful in reading the labels of FIG. 2.

The phototube 42 converts the diffuse light in the readback signal derived from scanning the article 16 into an electrical signal the amplitude of which corresponds to the amount of light reflected from the label. The phototube 42 is coupled to an amplifier 44 to amplify this electrical signal. The amplifier 44 is coupled to a utilization apparatus 45, which is illustrated in FIG. 3.

Figure 2A:
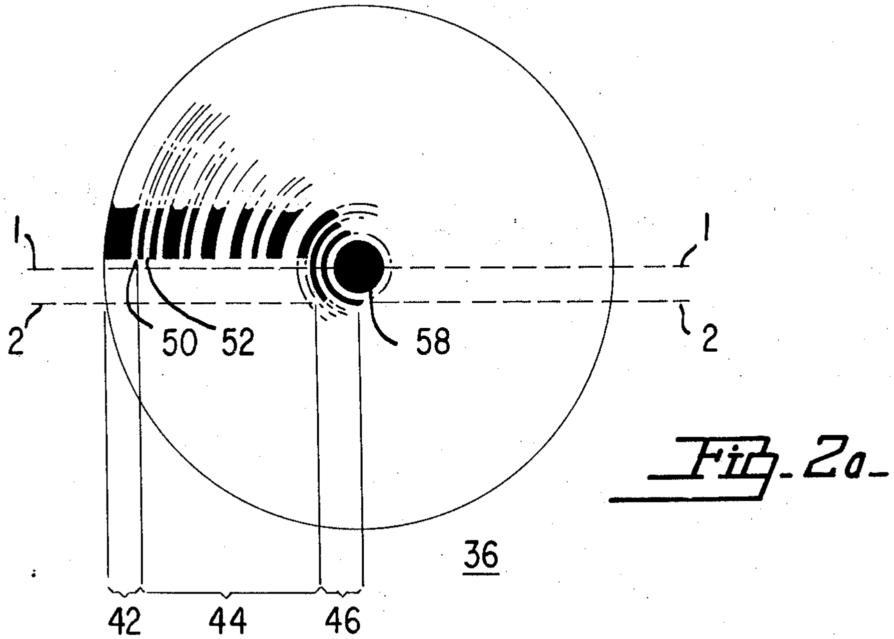
FIG. 2*a* is a pictorial representation of a typical designator label utilized in the identification system of FIG. 1.

FIG. 2*a* shows a machine readable label 36 for use in article identification. Such a label is particularly suited for use in supermarkets where the label is attached to or printed on each article offered for sale. The label may contain coded information relating to price, weight, manufacturers code or a unique code number for each brand name, commodity and size, or any combination of these. The label may be circular in shape to permit optical scanning equipment of FIG. 1 to "read" it along a line such as dashed line 1—1 without concern for orientation. The label contains a preamble section 42, a data section 44 and an end section 46.

The data section 44 may contain a plurality of digits binarily coded into annuli of first and second reflectivities. For example, a black band may represent a binary "1" while a white band may represent a binary "0". Any two colors may be chosen which have substantially differing reflectivities to the optical scanning equipment employed to read the labels. The data section contains a number of bands, each of a given unit width as measured along any diameter such as line 1—1. For example, 0.05 inch may be chosen as the unit width of a band. Then a black annulus 50 of 0.10 inch width (i.e. two bands) represents two adjacent "1" bits. A white annulus 52 of 0.05 inch width (i.e. one band) represents a single 0 bit. The scanning equipment sends a pinpoint light beam across the label. The reflected light is detected and converted to an electrical signal. Since the rate of motion of the spot is known, the time between transitions from black to white or white to black is a measure of the width of a white or black area and of the number of "1" or "0" bits and is used by the scanning equipment in the decoding process.

Figure 2B:
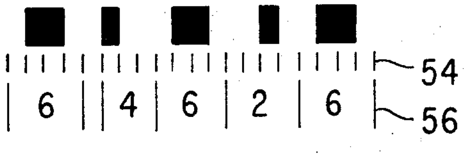
FIG. 2*b* is a data section of the designator label.

The data section may be subdivided into groups, each having four adjacent bands, each group representing one decimal digit. There may be any number of such groups. For example, FIG. 2*b* represents a data section of five decimal digits coded in binary coded decimal form to represent the number 64626. The figure is illustrated with bars rather than annuli for convenience. Tic lines 54 and 56 denote respectively the boundaries between adjacent bit positions and decimal digit positions. It is possible that a data pattern could develop such that many adjacent bands could be one color. This would present no problem to the optical scanning equipment if the width of each data band could be accurately maintained and the label is always a known fixed distance from the reading equipment.

In practice, neither of the above conditions are met. The printing is not perfect. Further, the label may be on a flat surface just above slit 18 or it may be, for example, on the concave bottom of an aerosol can. There must therefore be some clocking scheme built into the label. This may be accomplished, it has been found, by limiting the number of consecutive "1" or "0" bits (that is, black or white bands) in a decimal digit.

TABLE 1

| | Bit Position | 0 | 1 | 2 | 3 | 4 | 5 | 6 | 7 | 8 | 9 |
|---|---|---|---|---|---|---|---|---|---|---|---|
| Decimal Number | | 0 | 1 | 2 | 3 | 4 | 5 | 6 | 7 | 8 | 9 |
| Binary Designation | $2^3$ | 0 | 0 | 0 | 0 | 0 | 1 | 1 | 1 | 1 | 1 |
| | $2^2$ | 0 | 0 | 1 | 1 | 1 | 0 | 0 | 0 | 1 | 1 |
| | $2^1$ | 1 | 1 | 0 | 0 | 1 | 0 | 1 | 1 | 0 | 0 |
| | $2^0$ | 0 | 1 | 0 | 1 | 0 | 1 | 0 | 1 | 0 | 1 |

Table 1 illustrates a code scheme in which there are no more than two adjacent "1" bits or "0" bits for any of the 10 decimal digits. Therefore in two adjacent decimal digits, there will never be more than 4 adjacent bits of the same value. Said another way, a transition from white to black or black to white will always occur after no more than four bands. It has been found that scanning equipment can be designed which can operate properly with all tolerance buildups expected in four adjacent bands of a given color. The equipment can be designed to reset or rephase each time a transition from white to black or black to white occurs.

While any code containing no more than $n$ consecutive "1" bits or "0" bits ($n = 2$ in the example given) is satisfactory for use with the equipment of FIG. 1, the code set forth in Table 1 is particularly useful. It may be easily converted to a standard binary code by means of hardware logic or a computer program which adopts the following two rules. If the $2^3$ bit is 0, subtract the binary equivalent of the decimal number 2 from the value given in Table 1 to get the standard binary value. If the $2^3$ bit is 1, subtract the binary equivalent of the decimal number 4.

Referring again to FIG. 2*a* it is seen that a preamble section 42 precedes and an end section 46 follows the data section. The preamble section consists of a large number, such as at least five adjacent bands of one reflectivity, separated from the data by a band of the other reflectivity of 1 unit width. FIG. 2*a* illustrates a black outer annulus and an adjacent white inner annulus but the opposite colors could be chosen and it would work equally well. An outer annulus of at least 5 units width is chosen so that the optical scanning equipment will not confuse it with data which can have no more than four adjacent units of the same reflectivity. The single unit inner band being of the opposite reflectance from the outer band will ensure a transition and will therefore reset the clock of the optical scanning equipment to start timing as it scans across the data which follows.

The end section 46 in FIG. 2*a* comprises (following the last data band) a white band, a black band, a white band and a center bull's-eye 58 of at least seven black bands to the center. The center bull's-eye 58 must include a sufficient number of unit widths to ensure that the scanning equipment will scan through it while the container and label attached to it are being moved past the scanning equipment in a direction transverse the scan direction. It has been found that a bull's-eye of at least seven bands will work satisfactorily with the scanning equipment. The single unit band surrounding the inner bull's-eye of the opposite reflectivity ensures a transition when the optical scanning equipment scans from the data to the bull's-eye or from the bull's-eye to the data.

A problem arises if a scanning trace is made parallel to a true diameter, but outside of the solid black center. In fact, if the scan is at a given distance for a particular code, an error is decoding can occur. For example, if the last information band is black and the trace goes through this band, but not through the next white band or the center, this last black information band appears to be the center. The fact that the trace did not go through the center could theoretically be caught by counting the number of fixed and variable information bands. This means is not sufficient to detect errors, however, due to the fact that some information bands near the center may appear stretched sufficiently due to the off center scanning trace so that additional data bands seem to be added. As a matter of fact, it is possible that such an off-the-center trace will look exactly like a trace through the center of a label coded for another number.

In order to prevent such erroneous decoding, a fixed pattern of alternating single unit data bands is provided near the center of the label so that an error in timing due to an off-center trace may be detected and rejected. This pattern may comprise a white band, a black band, a white band then the center black bull's-eye. As will be described more fully, if any of the bands appear to the scanning equipment as double bands, an off center read must be occurring and the scan will be rejected.

The system illustrated in FIG. 3 performs a number of validity checks on the information read from label 36 (FIG. 2) to ensure that: (1) a label, rather than the background on the article to which a label is attached, is read and, (2) the scan occurs through, or nearly through the center of the label. The system also includes a clock circuit which is synchronized by the data scanned from label 36.

In FIG. 3 the output terminal of optical scanner 10 is connected to the input leads to two transition detectors 60 and 62. The amplifier 44 (FIG. 1) within scanner 10 may produce the waveform 64 as beam 28 scans across a label 36. That is, it may produce a relatively high voltage arbitrarily called a binary "1" when beam 28 is scanning across a black annulus and may produce a relatively low voltage arbitrarily called a binary "0" when beam 28 is scanning across a white annulus. Transition detector 60, which may be of any conventional type, produces a momentary pulse whenever a transition from white to black occurs. Transition detector 62 of similar construction is designed to produce a momentary pulse when a transition from black to white occurs. The output signals produced by transition detectors 60 and 62 are applied to the set (S) and reset (R) input terminals, respectively, of first flip-flop 66. The transition detectors are also connected to the OR gate 68 which produces a pulse whenever a transition from black to white or white to black occurs.

The 1 output terminal of flip-flop 66 is connected to the data input terminal of a reversible shift register 70. This shift register is of a conventional variety which, in response to a shift pulse, shifts its data to the left or the right, depending on the value of a control signal being applied at that time. Shift register 70 must be of sufficient capacity to hold the entire data section read from the label 36 as well as certain bits of information in the preamble and end sections of the data.

The 1 output terminal of flip-flop 66 is also connected to AND gates 72 and 74. AND gates 72 and 74 each have three normal input terminals and one inhibit terminal (the latter indicated by a circle). A gate such as this produces a 1 (high) output only when it receives 1's at its three normal terminals and a 0 (a low) at its inhibit terminal. AND gate 72 receives a STROBE signal, a register output signal and a control signal at its three normal input terminals and a signal from flip-flop 66 at its inhibit terminal. AND gate 74 receives a STROBE signal, a signal from flip-flop 66 and a control signal at its three normal input terminals, and an output signal from the register at its inhibit terminal.

The first several bit positions in shift register 70 are wired to certain AND gates and other elements to permit validity checks to be performed on groups of information bits. For example, the first 6 bit positions of shift register 70 are connected to AND gate 78. Bit position one is connected to an inhibit terminal of AND gate 78. The remaining positions are coupled to normal input terminals. The purpose of this gate is to check for the preamble of a label which, as stated previously, comprises at least five 1 bits (5 black bands) followed by one 0 bit (white band).

The first four bit positions of shift register 70 are connected as inputs to 4:16 encoder 80. This is a standard encoder of the type which converts a 4 bit code to a one in 16 code (one of the 16 output lines high, the remaining 15 low). The 10 output lines from encoder 80 which correspond to the 10 allowable of the 16 possible 4 bit combinations, as shown in Table 1, connect to the 10 input leads to OR gate 82. OR gate 82 is coupled to an inhibit terminal of AND gate 84.

The first 4 bit positions of shift register 70 are also connected to gate means 86. This gate means is wired to produce a signal for enabling OR gate 122 if at time CT24 (discussed later) the end section 46, to and including the first black band of bull's-eye 58, that is, 0101, is not present at bit positions 4, 3, 2 and 1, respectively, of shift register 70. At all times other than CT24, the signal produced by gate means 86 should have no effect on the OR gate 122.

The output lead of OR gate 68 is connected to one of the input terminals of AND gate 88 and to a 500 nanosecond delay flop 89. A delay flop is a monostable multivibrator. The one shown normally produces a 0 (low) output at its Q output terminal and a 1 (high) output at its Q terminal. Shortly after the delay flop receives a pulse from OR gate 68, it produces at its Q terminal a 1 (high) output and this output remains a 1 for the delay interval, in this case 500 nanoseconds. This interval is chosen to be less than the time required for beam 28 (FIG. 1) to scan across one band of label 36.

In operation, in response to a pulse, AND gate 88 becomes primed but, by the time the output signal of the delay flop changes to a 1, the pulse terminates so that gate 88 is not enabled. However, whenever two succeeding transitions occur within 500 nanoseconds, the second pulse applied to lead 88*a* occurs during the time lead 88*b* is high so that AND gate 88 becomes enabled, resetting the logic circuitry of FIG. 3 as described later. This second pulse, if it occurs in less than 500 nanoseconds, is interpreted to be a noise pulse. If the second transition occurs more than 500 nanoseconds after the first, then AND gate 88 remains disabled. Lead 88 goes high but by that time, delay flop has returned to its original condition so lead 88*b* is low.

The output terminal of OR gate 68 is also connected to one input lead to OR gate 90, of a clock circuit 91. The output signal of OR gate 90 is applied to a one shot 92 and to a 100 nanosecond delay means 94. The output terminal of one shot 92 is connected to a 900 nanosecond delay means 93 and a 400 nanosecond delay flop 95. The 900 nanosecond delay time is chosen with consideration given to the speed with which beam 28 (FIG. 1) scans label 36, and is chosen to be slightly longer than the time required for the beam to cross along a center line 1 (FIG. 2) a distance of one band. The 400 nanosecond delay time is chosen to be the difference between the delay times of delay means 93 and the delay flop 89 for reasons which will become clear in connection with the description of the operation of the circuit. The output terminal of delay means 93 and the $\bar{Q}$ output terminal of delay flop 95 are each connected to an input terminal of AND gate 96. The output terminal of AND gate 96 is connected back to the second input terminal of OR gate 90. The output signal of delay means 94 is a CLOCK signal. The CLOCK signal is applied to a 150 nanosecond delay means 98. The output signal produced by this delay means is a STROBE signal. Each of delay circuits 93, 94 and 98 include, as is usual practice, the necessary shaping and amplification circuits to emit signals of the proper voltage, power and shape as required by the logic components to which they are connected. The CLOCK signal is applied to shift register 70 to advance the bits in the shift register and to the S input terminal of counter 100, each CLOCK signal altering the count by 1.

Clock circuit 91 produces a CLOCK and a STROBE pulse in response to each pulse from OR gate 68. Thus, this circuit produces such pulses each time a transition from black to white or white to black occurs. Between transitions, CLOCK and STROBE pulses will occur every 900 nanoseconds because of the operation of delay means 92. As mentioned previously in connection with FIG. 2, when a label is being scanned, the band pattern is such that clock circuit 91 will be synchronized with a transition read from the label at least every 4 bands.

The STROBE signal is applied to each of AND gates 72, 74, 78, and 84 and to gate means 86.

Counter 100, to which the CLOCK signal is applied, is a conventional binary counter of the type which, in response to an appropriate control signal, can count either up or down. The counter is connected to two encoders, 101 and 102. Encoder 101 produces a pulse labeled CT4*n* whenever the counter is at any integral multiple of decimal 4. Encoder 102 produces a CT24 signal whenever the counter is at a count of 24. This number is equal to the number of data bands (5 digits, 4 bands per digit) plus the first 4 bands of the end section 46 of label 36. A carry out signal, labeled CO, is present after the counter reaches a count of zero and then receives another decrement pulse.

The CT4*n* signal serves as an input signal to AND gate 84. The CT24 signal is applied to gate means 86 and to AND gates 113 and 104, the latter AND gate being connected to the S input terminal of flip-flop 105. The 1 output terminal of flip-flop 105 is connected to counter 100 to control whether the counter will count up or down. The 1 output terminal of flip-flop 105 is also connected to shift register 70 to control the direction, left or right, that the register's contents will be shifted in response to shift pulses. When flip-flop 105 is reset, the shift register will shift to the right and the counter will count up. When flip-flop 105 is set, the shift register will shift to the left and the counter will count down. Finally, the 1 output terminal of flip-flop 105 connects to each of AND gates 72 and 74 to disable these gates when the shift register shifts right.

The 0 output terminal of flip-flop 105 is connected to AND gate 84 to disable it when the counter is counting down. The *CO* and CT24 signals are coupled to the input terminals of OR gate 106. The output signal of that gate and the STROBE signal are applied to AND gate 108, the output terminal of which is connected to the S input of flip-flop 110. The 0 output terminal of flip-flop 110 is connected to AND gate 96 for preventing the AND gate from becoming enabled whenever the flip-flop 110 is set. A transition pulse from OR gate 68 is coupled to the R input terminal of flip-flop 110 for resetting this flip-flop.

The 1 output terminal of flip-flop 110 is coupled to a one shot 111 which produces a short duration pulse whenever the flip-flop becomes set, and is also coupled to one input terminal of an AND gate 112. The one shot output signal is applied to each of AND gates 113 and 114. The CT24 and *CO* signals are connected respectively to the other input terminals of these AND gates. The output signals produced by AND gates 113 and 114 are applied to delay flops 116 and 118, respectively.

Delay flop 116 normally produces a 0 at its Q output terminal and in response to a 1 received from AND gate 113 produces a 1 output for a duration of 6.0 microseconds. AND gate 113 produces a 1 when a pulse is emitted from one shot 111 at a time when counter 100 is at a count of 24 (CT24 = 1). This occurs when beam 28 reaches the center bull's-eye portion of label 36. If the beam passes at or near to the center of the label (i.e. near to line 1—1, FIG. 2*a*) there will be no transition during the time delay flop 116 is set. Should there be a transition, error circuitry will be triggered as will be described.

Delay flop 118 normally produces a 0 at its Q output terminal and in response to a 1 from AND gate 114 produces a 1 output for an interval of 3.2 microseconds. The AND gate is enabled in response to the one shot 111 output signal when *CO* = 1. The *CO* = 1 signal occurs in response to the transition of the counter from a count of 0 to a count of −1 which in turn occurs when the beam 28 has scanned across a label and has reached the wide black outer annulus. As described in connection with delay flop 116, there should be no transition for 3.2 microseconds.

The 1 output signal produced at terminal Q of delay flop 116 and the output signal produced at terminal Q of delay flop 118 are applied to OR gate 119. The output signals produced by OR gates 119 and 68 are applied to AND gate 120. The $\bar{Q}$ output terminal of delay flop 118 is connected to a one shot 121 which produces a short duration pulse whenever the delay flop returns to its stable state (at the end of the 3.2 microseconds delay interval). The output signal produced by one shot 121 is applied as the second input signal to AND gate 112. The output signal produced by AND gate 112, legended VALID READ, is coupled to control circuit 130. The output signals produced by each of AND gates 72, 74, 84, 88, 112 and 120 are applied to normal input terminals of OR gate 122. The signal produced by gate means 86 is applied to a complementary input terminal to OR gate 122. OR gate 122 is coupled to the R input terminal of flip-flop 79. The 0 output terminal of flip-flop 79 is connected to the reset terminal of flip-flop 105 and counter 100. The counter will not count while the flip-flop is reset.

In connection with the description of the operation of the circuit of FIG. 3 which follows, the following conventions are established. Signals are assumed to proceed into elements on their left or at the top. Signals proceed out of elements from their right or from their bottom. Exceptions are noted by arrows. A relatively high voltage signal, also called a 1, corresponds to a scan of a black band of a label 36 while a relatively low voltage, also called a 0, corresponds to a scan across a white band of the label. An OR gate produces a high (1) output when any one or more of its input signals are high. An AND gate produces a high (1) output only when all of its input signals are high (1). A low signal into an input of either an AND gate or an OR gate with a small circle means that that signal will operate as a high signal within that OR or AND gate. Flip-flops are set and reset by high signals. When a flip-flop is set, it produces a high output at its 1 output and a low at its 0 output terminal.

In the description of the operation of the circuit of FIG. 3, it will be assumed that flip-flops 79, 105 and 110 are initially reset and that counter 100 contains a count of zero. Then, as the optical scanner 10 scans across an article 16 (FIG. 1) there are emitted from amplifier 44 a series of alternating relatively high and relatively low voltage signals corresponsing to changes in color as beam 28 scans across the article. These changes in color may be due to the light beam scanning across pictures, symbols or textual material on a container or may be due to a scan of a label 36. Therefore, transition detectors 60 and 62 continuously but aperiodically produce pulses corresponding to changes from relatively light areas on the container to relatively dark areas on the container. A pulse from either of these detectors enables OR gate 68 and OR gate 90 to trigger one shot 92 and delay means 94. The pulse which one shot 92 produces in response to a pulse from OR gate 90 enters delay line 93 and sets delay flop 95. During the time interval (400 nanoseconds) that delay flop 95 is set, the low $\bar{Q}$ output blocks AND gate 96. 900 nanoseconds after the pulse from one shot 92 enters delay line 93, it reaches the far end of the delay line. If delay flop 95 is not set at this time, AND gate 96 is enabled, OR gate 90 is enabled, one shot 92 is triggered, and the cycle repeats. Assume now that a transition occurs at $t_0$ and a second transition occurs at $t_1$ where $t_1$ is any time between $t_0 + 500$ nanoseconds and $t_o + 900$ nanoseconds. Then (ignoring delays at OR gate 90 and one shot 92) a pulse enters delay 93 and sets delay flop 95 blocking gate 96. At time $t_o + 400$ nanoseconds the delay flop resets and AND gate 96 is once again primed. Then at time $t_1$, a second pulse enters delay 93 and sets delay flop 95, again blocking AND gate 96 for 400 nanoseconds. Therefore, at $t_o +$ 900 nanoseconds when the first pulse, the one which entered the delay at $t_0$, reaches the end of the delay line, AND gate 96 is blocked. This is desired since pulses from AND gate 96 are desired only when a real transition has not occurred during the last 900 nanoseconds. However, in the example cited, a pulse has occurred at $t_1$ which is within 900 nanoseconds of the pulse which occurred at $t_0$. Therefore, no pulse from AND gate 96 is desired.

It should be recalled from a previous discussion that if a second pulse occurs within 500 nanoseconds of time $t_0$, AND gate 88 is enabled causing the reset of the system.

Since delay means 93 is coupled via AND gate 96 back to OR gate 90, a pulse from OR gate 90 is assured at least every 900 nanoseconds whether or not a transition is received from either of transition detectors 60 or 62, provided AND gate 96 is primed by flip-flop 110 and delay flop 95. It will be remembered that the 900 nanoseconds is chosen as being the maximum time required for scanning beam 28 (FIG. 1) to scan across one band of label 36. After a short delay of 100 nanoseconds, a CLOCK pulse is produced by delay means 94. The short delay is to enable the signal from optical scanner 10 to stabilize before it is acted upon. The CLOCK pulse causes a right shift of the data in shift register 70 and the admission of one new bit of information from data flip-flop 66. This flip-flop will be set or reset depending upon which of transition detectors 60 or 62 last produced a pulse. That is, when the flip-flop is set, it indicates that a black or relatively dark signal is being received by scanner 10 and when the flip-flop is reset, it indicates that a relatively light or white signal is being received by the scanner 10.

The data, as it enters shift register 70, is constantly being monitored by AND gate 78. This AND gate is strobed by the STROBE signal shortly (150 nanoseconds) after each CLOCK pulse advances data into shift register 70. Whenever the first 6 bits of shift register 70 contain data corresponding to five black bands followed by a white band (i.e., shift register positions two through six contain ones while shift register position one contains a zero), it is assumed that the scanner has scanned across the preamble section 42 of label 36. Then when the STROBE signal is emitted from delay means 98, AND gate 78 will be enabled and flip-flop 79 set.

When AND gate 78 is enabled and therefore flip-flop 79 is set, there is an indication that the scanner may have scanned across the preamble section of a label. Further checks will confirm or refute this assumption. When flip-flop 79 is set, the low output signal present at its 0 terminal will cause the reset signal to be removed from counter 100 which will permit the counter to advance as each succeeding CLOCK signal is received at the S input terminal of the counter. Assuming that the scanner is in fact scanning across a label, the data bits which follow the preamble will be entered one-by-one into shift register 70 as each CLOCK pulse is produced. During this scan, the clock circuit 91 is resynchronized periodically by transitions in the data, which because of the proper choice of data bit patterns as already discussed, must occur after no more than 4 CLOCK pulses. When the counter reaches a count of four, indicating the first 4 data bits have been received, AND gate 84 will be strobed by the STROBE signal. If the shift register first four positions contain any 1 of the 10 valid bit combinations listed in Table 1, the output of OR gate 82 will be high and therefore AND gate 84 will be disabled. If any of the other combinations of four bits is present in this shift register, as will likely occur if the scanning beam is scanning the background material rather than a label or a region of the label sufficiently far from the center of the label, the output of OR gate 82 will be low and AND gate 84 will be enabled. If AND gate 84 is enabled, the resulting high output from OR gate 122 resets flip-flop 79 which resets counter 100. Whenever flip-flop 79 is reset, a combination of bits thought to be the preamble will again enable gate 78 causing flip-flop 79 to then become set.

When a count of eight, that is, four times two, is set in counter 100, AND gate 84 will again be strobed. As described previously, if the first 4 bit positions of shift register 70 contain a valid combination of bits in accordance with Table 1, the gate 84 will be disabled. If it does not, the gate will be enabled and flip-flop 79 will be reset. This procedure continues until the counter reaches a count of 24.

A count of 24 is significant for three reasons. First, any count other than zero indicates that the preamble was detected and second, it indicates that five groups of 4 data bits have been read and have been determined to be valid combinations of 4 bits. And third, it indicates that the first 4 bit positions of shift register 70 should contain signals corresponding to white, black, white, black or in other words, the first four bands of the end section 46 of label 36. If that combination is not present when a count of 24 is reached, gate means 86 will enable OR gate 122 and the resulting high from OR gate 122 will reset flip-flop 79 and reset counter 100 to a count of zero thereby requiring that the entire process begin again.

In an initial implementation of the system described above, the logic circuit of FIG. 3 did not contain this validity check. It was found that in the absence of this circuit, certain data combinations read across line 2—2 (FIG. 2*a*) would cause all validity checks heretofore described to be passed even though an incorrect read of the label has occurred. When, at the count of 24, gate means 86 does not enable OR gate 122, there is strong but not conclusive evidence that the scan is occurring across a label and across the center of that label.

The CT24 signal at OR gate 106 combined with the STROBE signal at AND gate 108 enables the AND gate 108 which causes flip-flop 110 to be set. When flip-flop 110 is set, the resulting low signal at its zero output disables AND gate 96. This prevents delay means 92 from producing CLOCK and STROBE signals but does not prevent transitions, as represented by a high output of OR gate 68, from producing a CLOCK and STROBE signal. The 1 output of flip-flop 110 going high causes a pulse to be emitted from one shot 111 which, via enabled AND gate 113, triggers delay flop 116. If the beam is truly scanning through the center of a label, there should be no transition for at least 6 microseconds after delay flop 116 becomes set. Any such premature transition will enable AND gate 120, primed by delay flop 116, via OR gate 119. Enabled AND gate 120 enables OR gate 122 which causes flip-flop 79 to become reset which, as previously described, starts the scanning operation all over again. The 1 output terminal of flip-flop 105, which is connected to the control input terminal of shift register 70 and to counter 100, causes the shift register, when it receives CLOCK pulses, to shift from right to left and causes the counter, when it receives CLOCK pulses, to count down rather than up.

The transition from the black bull's-eye section to the white surrounding band if not premature, causes a pulse to be produced from transition detector 62 which causes a CLOCK and STROBE pulse to be produced and resets flip-flop 110, thus permitting the CLOCK circuit to resume emitting spaced CLOCK and STROBE pulse signals. As the scanner scans across the right half of the label, the information read is compared with the information stored in shift register 70 at AND gates 72 and 74. If any error occurs between the data contained in the shift register and the data as it appears at flip-flop 66, one or the other of AND gates 72 and 74 will be enabled. The resulting high output from OR gate 122 causes flip-flop 79 to be reset.

The counter reaches a count of zero when the beam 28 has passed through the label and is scanning the single white preamble band and this is an indication that the information as stored in the shift register 70 (i.e. the information on the left side of a label 36 agrees with the information on the right side of that label). As the beam scans to the outer black annulus, the resulting CLOCK signal attempts to decrement counter 100 resulting in the generation of the *CO* signal. At this point, there is a strong indication that a label has been scanned and read correctly. One last validity check remains however.

The *CO* signal, via OR gate 100, and the STROBE signal, combine to enable AND gate 108 and set flip-flop 110. The low 0 output signal of flip-flop 110 disables gate 96 thereby preventing CLOCK and STROBE pulses. The signal present at the 1 output terminal of the flip-flop 110, via one shot 111 and enabled AND gate 114, triggers delay flop 118. The high present at the Q output terminal of the delay flop primes AND gate 120 via OR gate 119. If a transition occurs before the delay flop 118 resets, the resulting high from OR gate 68 enables gate 120 which produces the resetting signal from gate 122.

The 3.2 microsecond delay of delay flop 118 is shorter than the time required for beam 28 to scan the outer black annulus of a label 36. Therefore, a transition while the delay flop is set indicates a faulty label or that the scan was across something other than a label. When delay flop 118 resets, the resulting output from one shot 121 and a 1 output from flip-flop 110 combine to enable AND gate 112 to produce a reset signal at OR gate 122 and a VALID READ signal. This signal may be used in a number of ways. For example, it may be sent to a computer (not shown) which causes the information contained within shift register 70 to be shifted out to the computer. Alternatively, it may cause the information to be shifted out of the shift register 70 into another storage shift register to be used in any suitable manner.

In summary, there have been described a series of validity checks which are performed while scanning a label 36 (FIG. 2). First, a check is continuously performed at AND gate 88 to ensure that two transitions do not occur too close together. Then, a check is continuously performed at AND gate 78 to ascertain whether the preamble of a label has been scanned. Next, as each four successive bits of information are received at shift register 70, a check is performed at AND gate 84 to determine whether they are one of the ten allowable combinations of data as listed in Table 1. When the counter reaches a count indicating that the scan beam should have scanned to the first band of the bull's-eye at the center of the label, a check is made at gate means 86 to determine that the unique white, black, white, black pattern has been received by the shift register. A check is also performed at AND gate 120 to determine that the scan beam is passing through, or nearly through, the center of the label by determining that there are no transitions in the center bull's-eye portion of the label. Then, at AND gates 72 and 74 a check is performed to ensure that the data as read from the outside to the center of the label agrees bit for bit with the data as read from the center of the label to the outside. Finally, a check is performed also at AND gate 120 to ensure that the scan beam passes through the outer black annulus of the label.

What is claimed is:

1. Apparatus for serially optically scanning binary encoded information where said information contains regions of a first reflectivity alternating with regions of a second reflectivity, and wherein dimensions of each region along the scan path relate to the number of bits represented by that reflectivity, comprising, in combination:

means for producing a signal indicative of the binary information scanned, having one value when the scan is occurring over regions of the first reflectivity, and having a different value when the scan is occurring over regions of the second reflectivity;

means responsive to the signal from said first mentioned means for producing a signal indicative of a transition between said one and said different values; and clock means producing signals nominally corresponding to the boundary between successive bit positions and responsive to said signal from said transition producing signal means for resynchronizing said boundary representing signals to correspond with the boundaries between regions.

2. A self-clocking system comprising, in combination:

means producing successive signals, spaced intervals $\Delta t$ or integral multiples thereof from one another, a clock signal simulating circuit responsive to said signals from said first named means for producing in response to a first signal from said first named means not followed by a second signal within an interval $\Delta t$ from the first signal, a signal following the first signal by an interval slightly greater than $\Delta t$;

means in said simulating circuit responsive to signals from said first named means spaced intervals $\Delta t$ from one another for preventing said clock signal simulating circuit from producing signals; and a clock pulse source receptive of said signals produced by said first means and said signals produced by said clock signal simulating circuit for producing a clock signal in response to each signal it receives.

3. Apparatus for producing clock signals corresponding to boundaries between regions of a first reflectivity and regions of a second reflectivity on a medium, the dimensions of each region along a scan line corresponding to the number of bits of the same value represented by that region comprising, in combination:

means responsive to a scan along said scan line for producing a signal indicative of the binary information scanned, said signal having first and second values corresponding to said first and second reflectivities, means responsive to transitions between said levels for producing clock signals corresponding to said transitions, and means responsive to the presence of one of said clock signals, to an amount of time, after the occurrance of said clock signal, which is slightly greater than the time needed to scan the length of region occupied by a single bit, and to the absence of a second clock signal during that time, for also generating a clock signal.

4. A system for reading binary information visually represented on a medium in colors exhibiting two different reflectivities and which medium may also include background noise, wherein said binary information comprises a unique preamble identifying pattern and a data section containing a known number of bits, comprising, in combination:

scanning means for scanning said medium for producing signals the values of which correspond to the reflectivity of the portion of the medium being scanned;

means responsive to said scanning means signals in a bit pattern corresponding to said preamble identifying pattern for producing a signal indicating that the scan may be over said binary information on said medium;

a register;

means responsive to said signal which indicates that the scan may be over said binary information on said medium for causing the bits assumed to be data bits to be entered serially into said register; and counter means for counting each bit as it is entered into said register and for producing a signal when said known number of data bits have been entered.

5. The combination as set forth in claim 4 wherein following the production of said signal from said counter, said scanning means again scans said data section and further including means for producing a signal indicative of whether the signals produced by said scanning means on said second scan correspond to said information stored in said register.

6. The combination as set forth in claim 4 wherein said binary information further comprises an end section including a portion having at least a known number of consecutive bits of one value and further including timing means responsive to a scan onto said portion containing said bits of one value for producing a delayed signal prior to the time said scan should pass over said portion and means responsive to said signal for indicating that said known number of data bits have been entered and responsive to a signal that the time required to scan across said bits of one value of said end section has not passed and responsive to a signal from said scanning means indicating said scanning means is not scanning across said one value for producing an error signal.

7. The combination of:

a label having a pattern of concentric rings representing ones and zeros and said pattern also having a circular center region representing one of the binary values;

means for scanning the label along parallel lines passing through the pattern and for sensing the information represented thereby; and means for reading the information sensed by the last named means in response to a signal manifestation which indicates that the center region of the label has been sensed and that the length of said center region along the line being scanned is greater than a given length.

* * * * *